US012579413B2

(12) United States Patent
Donthu et al.

(10) Patent No.: US 12,579,413 B2
(45) Date of Patent: Mar. 17, 2026

(54) METHOD AND APPARATUS FOR PERFORMING CONVOLUTION NEURAL NETWORK OPERATIONS

(71) Applicant: Microchip Technology Inc., Chandler, AZ (US)

(72) Inventors: Sathishkumar Donthu, Hyderabad (IN); Battu Prakash Reddy, Hyderabad (IN)

(73) Assignee: Microchip Technology Inc., Chandler, AZ (US)

( * ) Notice: Subject to any disclaimer, the term of this patent is extended or adjusted under 35 U.S.C. 154(b) by 1093 days.

(21) Appl. No.: 17/480,282

(22) Filed: Sep. 21, 2021

(65) Prior Publication Data

US 2022/0300793 A1 Sep. 22, 2022

Related U.S. Application Data

(60) Provisional application No. 63/162,516, filed on Mar. 18, 2021.

(51) Int. Cl.
*G06N 3/063* (2023.01)
*G06F 7/50* (2006.01)
(Continued)

(52) U.S. Cl.
CPC ............... *G06N 3/063* (2013.01); *G06F 7/50* (2013.01); *G06F 7/523* (2013.01); *G06F 7/5443* (2013.01); *G06N 3/045* (2023.01); *G06N 3/0464* (2023.01)

(58) Field of Classification Search
CPC .......... G06N 3/063; G06F 7/50; G06F 7/523; G06F 7/5443
See application file for complete search history.

(56) References Cited

U.S. PATENT DOCUMENTS

| | | | |
|---|---|---|---|
| 5,204,938 A | 4/1993 | Skapura et al. | |
| 5,465,375 A | 11/1995 | Thepaut et al. | |

(Continued)

FOREIGN PATENT DOCUMENTS

| | | | | |
|---|---|---|---|---|
| CN | 108182471 A | * | 6/2018 | ......... G06K 9/00979 |
| CN | 109992541 A | * | 7/2019 | ............. G06F 13/28 |

OTHER PUBLICATIONS

Yu, Xiaoyu et al., A Data-Center FPGA Acceleration Platform for Convolutional Neural Networks, Nov. 7, 2019, 2019 29th International Conference on Field Programmable Logic and Applications (FPL), p. 155 (Year: 2019).*

(Continued)

*Primary Examiner* — James T Tsai
(74) *Attorney, Agent, or Firm* — Glass & Associates; Kenneth Glass

(57) ABSTRACT

A method and apparatus for performing a convolution of a N×N matrix. A weights matrix for a N×N Convolutional Neural Network (CNN) is received and is divided into 3×3 weights matrixes. Lines of image values are read and are stored in a buffer as sets of image values. A 3×3 convolution is performed to generate a 3×3 convolution value. All 3×3 convolution values associated with a particular N×N convolution and a particular set of image values are summed. The 3×3 convolutions and the summing are repeated until all columns in the set of image values have been processed; and the reading, the storing, the performing 3×3 convolutions, the summing and the repeating performing 3×3 convolutions are repeated until all lines of image values have been processed. The sums associated with a particular N×N convolution are added together to generate an N×N convolution value for each of the N×N convolutions.

20 Claims, 10 Drawing Sheets

(51) Int. Cl.

| | | |
|---|---|---|
| *G06F 7/523* | (2006.01) | |
| *G06F 7/544* | (2006.01) | |
| *G06N 3/045* | (2023.01) | |
| *G06N 3/0464* | (2023.01) | |

(56) References Cited

U.S. PATENT DOCUMENTS

| | | | |
|---|---|---|---|
| 10,657,617 B1 * | 5/2020 | Wang | G06T 7/73 |
| 10,671,564 B2 | 6/2020 | Henry et al. | |
| 2017/0103301 A1 | 4/2017 | Henry et al. | |
| 2017/0103302 A1 | 4/2017 | Henry et al. | |
| 2017/0103303 A1 | 4/2017 | Henry et al. | |
| 2017/0103304 A1 | 4/2017 | Henry et al. | |
| 2017/0103305 A1 | 4/2017 | Henry et al. | |
| 2017/0103306 A1 | 4/2017 | Henry et al. | |
| 2017/0103307 A1 | 4/2017 | Henry et al. | |
| 2017/0103310 A1 | 4/2017 | Henry et al. | |
| 2017/0103312 A1 | 4/2017 | Henry et al. | |
| 2017/0103316 A1 | 4/2017 | Ross et al. | |
| 2017/0103319 A1 | 4/2017 | Henry et al. | |
| 2017/0103320 A1 | 4/2017 | Henry et al. | |
| 2017/0103321 A1 | 4/2017 | Henry et al. | |
| 2019/0079801 A1 * | 3/2019 | Lyuh | G06F 15/8046 |
| 2019/0114499 A1 * | 4/2019 | Delaye | G06F 3/0656 |
| 2020/0126181 A1 * | 4/2020 | Zhang | G06T 3/4023 |
| 2020/0272946 A1 * | 8/2020 | Kim | G06N 20/10 |
| 2021/0089889 A1 * | 3/2021 | Gope | G06N 3/0495 |
| 2021/0182077 A1 * | 6/2021 | Chen | G06Q 30/0241 |
| 2021/0295140 A1 * | 9/2021 | Holm | G06F 17/18 |

OTHER PUBLICATIONS

Du, Li et al., A Reconfigurable Streaming Deep Convolutional Neural Network Accelerator for Internet of Things, Aug. 16, 2017, IEEE Transactions on Circuits and Systemsâl: Regular Papers—vol. 65,—Issue 1, pp. 199-202, 204 (Year: 2018).*

Lee, Kyung et al., An Implementation of NNEF-Darknet Neural Network Model Converter, Dec. 21, 2020, 2020 International Conference on Information and Communication Technology Convergence (ICTC), p. 1 (Year: 2020).*

Tang, Yinqi et al., Energy-efficient Pedestrian Detection System: Exploiting Statistical Error Compensation for Lossy Memory-data Compression, Jul. 1, 2018, IEEE Transactions on Very Large Scale Integration (VLSI) Systems—vol. 26—No. 7, p. 6 (Year: 2018).*

Lian, Ruo, A Framework for FPGA-Based Acceleration of Neural Network Inference with Limited Numerical Precision via High-Level Synthesis with Streaming Functionality, 2016, Univerty of Toronto, pp. 23, 35 (Year: 2016).*

Tourad, El Hadrami et al., Survey of Deep Learning Neural Networks Implementation on FPGAs, Mar. 2, 2021, 2020 5th International Conference on Cloud Computing and Artificial Intelligence: Technologies and Applications (CloudTech), p. 2 (Year: 2021).*

Shi, Runbin et al., High-Throughput Line Buffer Microarchitecture for Arbitrary Sized Streaming Image Processing, Jan. 21, 2019 , Journal of Imaging, vol. 5, issue 3, pp. 5, 7 (Year: 2019).*

Wang, J., Lin, J., & Wang, Z. (Oct. 2016). Efficient convolution architectures for convolutional neural network. In 2016 8th International Conference on Wireless Communications & Signal Processing (WCSP) (pp. 1-5). IEEE. (Year: 2016).*

Conti Franscesco et al: "A ultra-low-energy convolution engine for fast brain-inspired vision in multicore clusters", 2015 Design, Automation & Test in Europe Conference & Exhibition (DATE), EDAA, Mar. 9, 2015 (Mar. 9, 2015), pp. 683-688, XP032765876, DOI: 10.7873/DATE.2015.0404.

David Gschwend: "ZynqNet: An FPGA-Accelerated Embedded Convolutional Neural Network", arxiv.org, Cornell University Library, 201 Olin Library Cornell University Ithaca, NY 14853, May 14, 2020 (May 14, 2020), XP081673689.

Meloni Paolo et al: "CNN hardware acceleration on a low-power and low-cost APSoC", 2019 Conference on Design and Architectures for Signal and Image Processing (DASIP), IEEE, Oct. 16, 2019 (Oct. 16, 2019), pp. 7-12, XP033750957, DOI: 10.1109/DASIP48288.2019.9049213.

Sun Baohua et al: "Ultra Power-Efficient CNN Domain Specific Accelerator with 9.3TOPS/Watt for Mobile and Embedded Applications", 2018 IEEE/CVF Conference on Computer Vision and Pattern Recognition Workshops (CVPRW), IEEE, Jun. 18, 2018 (Jun. 18, 2018), pp. 1758-17588, XP033475521, DOI: 10.1109/CVPRW.2018.00219.

PCT/US2021/053281, International Search Report and Written Opinion, European Patent Office, mailed Jan. 26, 2022.

* cited by examiner

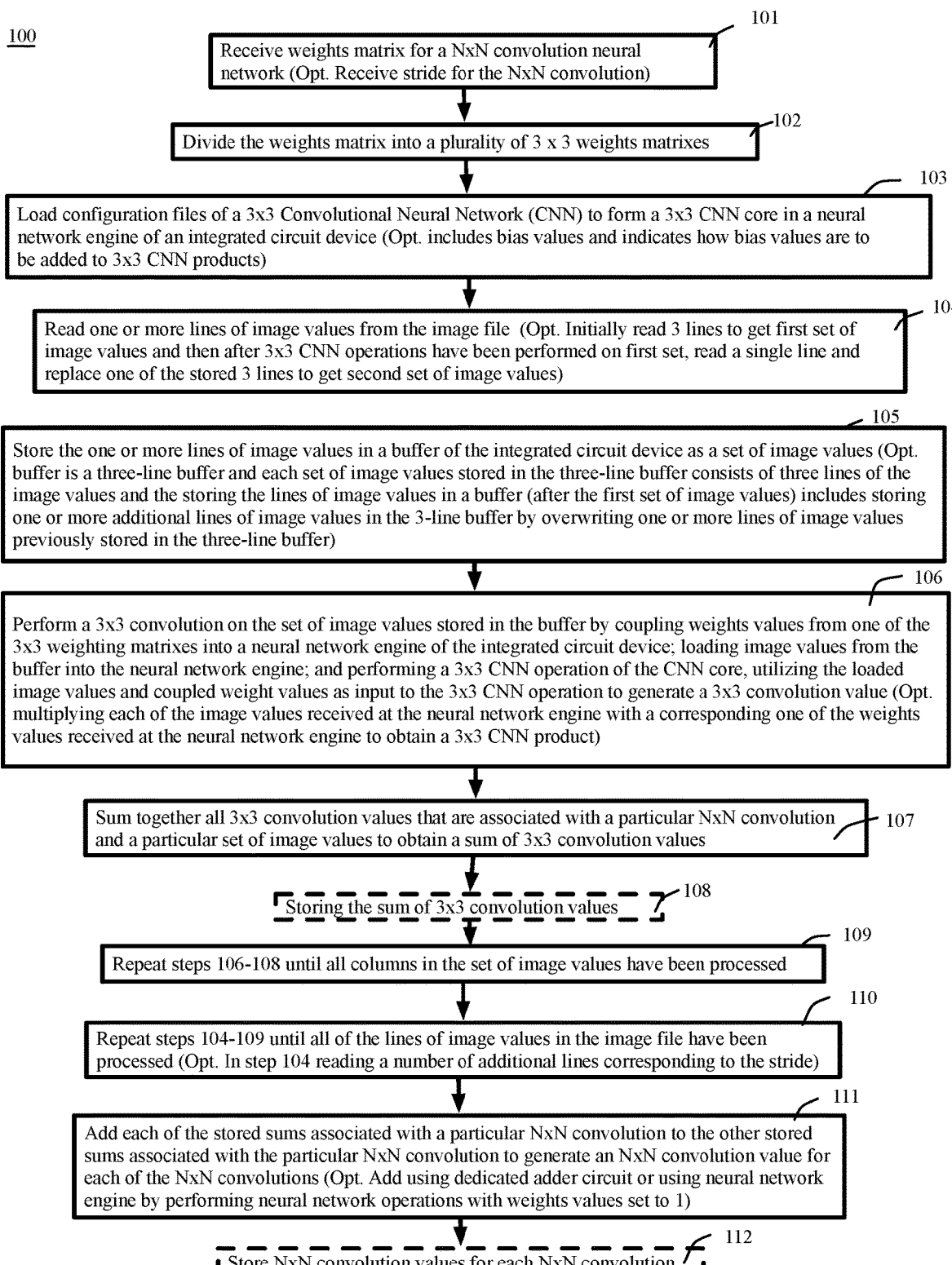

100

101
Receive weights matrix for a NxN convolution neural network (Opt. Receive stride for the NxN convolution)

102
Divide the weights matrix into a plurality of 3 x 3 weights matrixes

103
Load configuration files of a 3x3 Convolutional Neural Network (CNN) to form a 3x3 CNN core in a neural network engine of an integrated circuit device (Opt. includes bias values and indicates how bias values are to be added to 3x3 CNN products)

104
Read one or more lines of image values from the image file (Opt. Initially read 3 lines to get first set of image values and then after 3x3 CNN operations have been performed on first set, read a single line and replace one of the stored 3 lines to get second set of image values)

105
Store the one or more lines of image values in a buffer of the integrated circuit device as a set of image values (Opt. buffer is a three-line buffer and each set of image values stored in the three-line buffer consists of three lines of the image values and the storing the lines of image values in a buffer (after the first set of image values) includes storing one or more additional lines of image values in the 3-line buffer by overwriting one or more lines of image values previously stored in the three-line buffer)

106
Perform a 3x3 convolution on the set of image values stored in the buffer by coupling weights values from one of the 3x3 weighting matrixes into a neural network engine of the integrated circuit device; loading image values from the buffer into the neural network engine; and performing a 3x3 CNN operation of the CNN core, utilizing the loaded image values and coupled weight values as input to the 3x3 CNN operation to generate a 3x3 convolution value (Opt. multiplying each of the image values received at the neural network engine with a corresponding one of the weights values received at the neural network engine to obtain a 3x3 CNN product)

107
Sum together all 3x3 convolution values that are associated with a particular NxN convolution and a particular set of image values to obtain a sum of 3x3 convolution values 108
Storing the sum of 3x3 convolution values 109
Repeat steps 106-108 until all columns in the set of image values have been processed 110
Repeat steps 104-109 until all of the lines of image values in the image file have been processed (Opt. In step 104 reading a number of additional lines corresponding to the stride)

111
Add each of the stored sums associated with a particular NxN convolution to the other stored sums associated with the particular NxN convolution to generate an NxN convolution value for each of the NxN convolutions (Opt. Add using dedicated adder circuit or using neural network engine by performing neural network operations with weights values set to 1)

112
Store NxN convolution values for each NxN convolution

FIG. 2

IMAGE/LAYER — 26
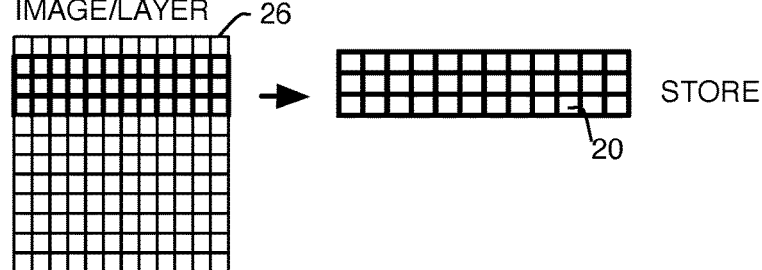
STORE
20
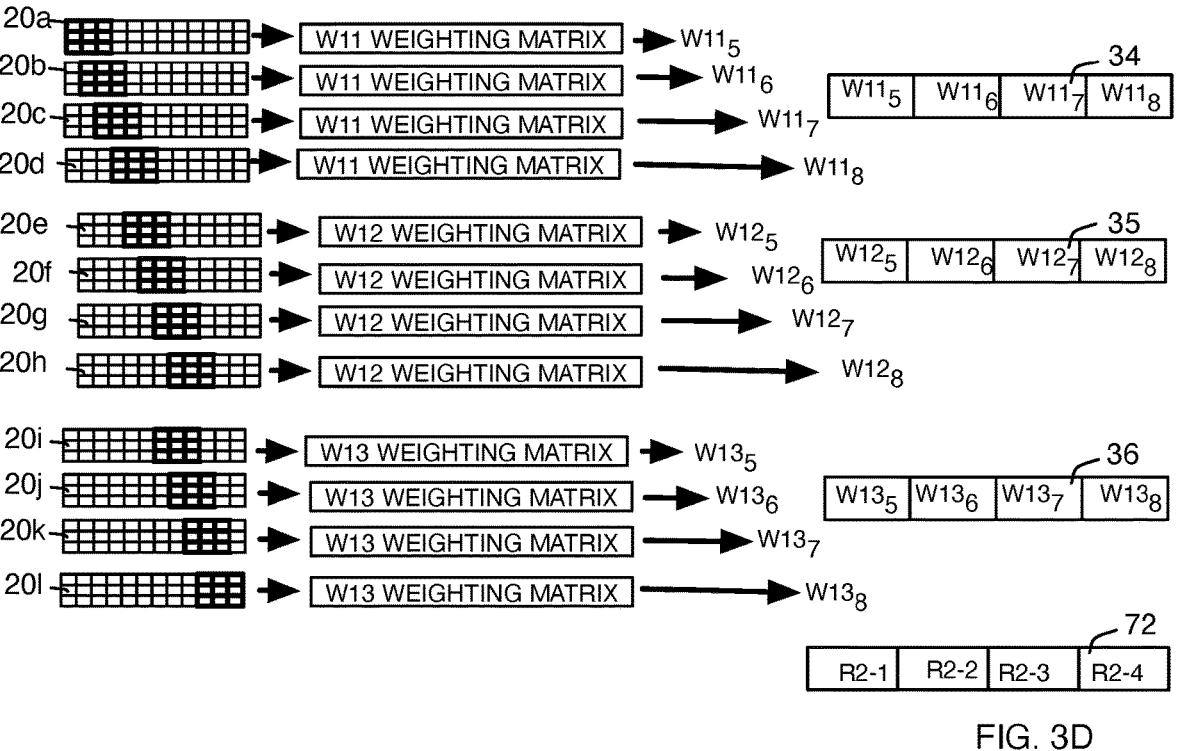
FIG. 3D

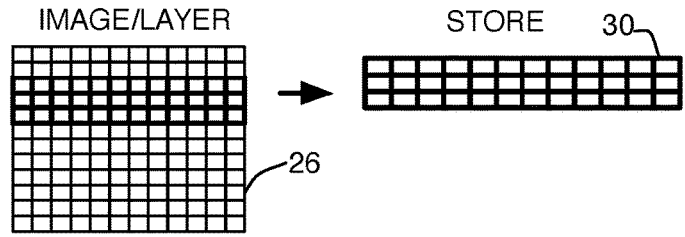

IMAGE/LAYER    STORE    30

26

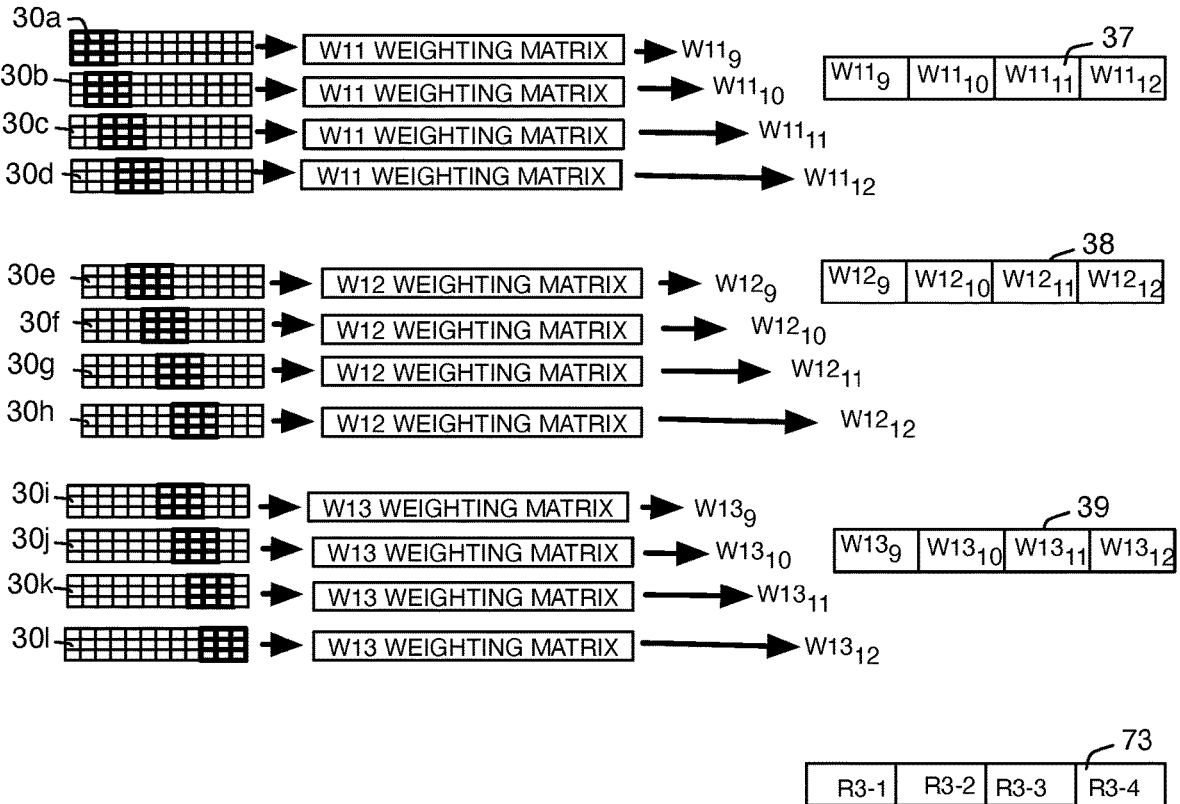

30a — W11 WEIGHTING MATRIX → $W11_9$

30b — W11 WEIGHTING MATRIX → $W11_{10}$

30c — W11 WEIGHTING MATRIX → $W11_{11}$

30d — W11 WEIGHTING MATRIX → $W11_{12}$

37
| $W11_9$ | $W11_{10}$ | $W11_{11}$ | $W11_{12}$ |

30e — W12 WEIGHTING MATRIX → $W12_9$

30f — W12 WEIGHTING MATRIX → $W12_{10}$

30g — W12 WEIGHTING MATRIX → $W12_{11}$

30h — W12 WEIGHTING MATRIX → $W12_{12}$

38
| $W12_9$ | $W12_{10}$ | $W12_{11}$ | $W12_{12}$ |

30i — W13 WEIGHTING MATRIX → $W13_9$

30j — W13 WEIGHTING MATRIX → $W13_{10}$

30k — W13 WEIGHTING MATRIX → $W13_{11}$

30l — W13 WEIGHTING MATRIX → $W13_{12}$

METHOD AND APPARATUS FOR PERFORMING CONVOLUTION NEURAL NETWORK OPERATIONS

CROSS-REFERENCE TO RELATED APPLICATIONS

The present application claims priority to U.S. Provisional Patent Application Ser. No. 63/162,516 filed on Mar. 18, 2021, the contents of which are incorporated by reference herein in their entirety.

BACKGROUND OF THE INVENTION

Convolution Neural Networks (CNNs) used in computer vision have multiple layers and use convolution as a basic operation. The convolution matrix is usually of the size 3×3, 5×5, 7×7, 9×9 or 11×11. CNN's are typically implemented using a Programmable Logic Device (PLD) such as a Field Programmable Gate Array (FPGA) or using an Application Specific Integrated Circuit (ASIC) having specialized circuitry to achieve fast processing time. However, the number of memory blocks required to frame a matrix from the input image and the number of multipliers is directly proportional to the size of the matrix. Also, the number of registers required to hold the convolution weights matrix values is directly proportional to the size of the matrix. The large number of memory blocks, multipliers, and registers requires significant power and adds expense, making implementation of larger CNN's (CNN's having a size greater than 3×3) difficult to implement on small size FPGA's and ASIC's.

For example, a system for computing a convolution of a 11×11 matrix can require 11 memory blocks, 121 registers for convolution weights matrix, 121 registers for weights values and 121 parallel multipliers.

Accordingly, what is needed in the art is a method and apparatus that allows for implementing large CNN's that provides lower cost and lower power than current systems.

SUMMARY OF THE INVENTION

A method for performing N×N convolutions on an image file that includes lines of image values is disclosed that includes receiving a weights matrix for an N×N convolution and dividing the weights matrix into a plurality of 3×3 weights matrixes. Configuration files for a 3×3 CNN are loaded into an Integrated Circuit (IC) device to form a 3×3 CNN core in a neural network engine of the IC device. One or more lines of image values are read from the image file and are stored in a buffer of the integrated circuit device as a set of image values. A 3×3 convolution is performed on the set of image values stored in the buffer by: coupling weights values from one of the 3×3 weights matrixes into a neural network engine of the integrated circuit device; loading image values from the buffer into the neural network engine; performing a 3×3 CNN operation of the CNN core, utilizing the loaded image values and coupled weights values from one of the 3×3 weights matrixes as input to the 3×3 CNN operation to generate a 3×3 convolution value. All 3×3 convolution values that are associated with a particular N×N convolution and a particular set of image values are summed together to obtain a sum of 3×3 values. The performing 3×3 convolutions and the summing are repeated until all columns in the set of image values have been processed; and the reading, the storing one or more lines of image values in a buffer, the performing 3×3 convolutions, the summing and the repeating the performing 3×3 convolutions are repeated until all lines of image values in the image file have been processed. Each of the sums associated with a particular N×N convolution is added to the other stored sums associated with the particular N×N convolution to generate an N×N convolution value for each of the N×N convolutions.

An IC device is disclosed that includes a write circuit and a read circuit to read one or more lines of image values from an image file and to perform a read to obtain a weights matrix for a N by N convolution neural network. An N×N CNN circuit of the IC device includes a neural network engine, a controller coupled to the neural network engine, the read circuit and the write circuit, a weight matrix framer coupled to the read circuit and to the neural network engine, an activation matrix framer coupled to the read circuit and to the neural network engine and an accumulator circuit coupled to the neural network engine and to the write circuit. The controller is to divide the weights matrix into a plurality of 3×3 weights matrixes and to load configuration files for a 3×3 CNN into the IC device to form a 3×3 CNN core in the neural network engine of the IC device. The weight matrix framer is to load one of the 3×3 weights matrixes into the neural network engine. The activation matrix framer includes buffers to store the one or more lines of image values as sets of image values and is to load image values from each of the sets of image values into the neural network engine. Upon receiving the one of the 3×3 weights matrixes and the image values the neural network engine is to perform a 3×3 CNN operation of the 3×3 CNN core to generate a 3×3 convolution value. The accumulator circuit is to sum together all 3×3 convolution values that are associated with a particular N×N convolution and a particular set of image values and is to store each sum of 3×3 convolution values. The IC device is further to add each of the stored sums associated with a particular N×N convolution to the other stored sums associated with the particular N×N convolution to generate an N×N convolution value for each of the N×N convolutions.

A PLD is disclosed that includes a write circuit and a read circuit. The read circuit is to read one or more lines of image values from an image file and to perform a read to obtain a weights matrix for a N by N convolution neural network. An N×N CNN circuit included in the PLD includes a neural network engine, a controller coupled to the neural network engine, the read circuit and the write circuit, a weight matrix framer coupled to the read circuit and to the neural network engine, an activation matrix framer coupled to the read circuit and to the neural network engine and an accumulator circuit coupled to the neural network engine and to the write circuit. The controller is to divide the weights matrix into a plurality of 3×3 weights matrixes and to load configuration files for a 3×3 CNN into the PLD to form a 3×3 CNN core in the neural network engine of the PLD. The weight matrix framer is to load one of the 3×3 weights matrixes into the neural network engine. The activation matrix framer includes buffers is to store the one or more lines of image values as sets of image values and is to load image values from each of the sets of image values into the neural network engine. Upon receiving the one of the 3×3 weights matrixes and the image values, the neural network engine is to perform a 3×3 CNN operation of the 3×3 CNN core to generate a 3×3 convolution value. The accumulator circuit is to sum together all 3×3 convolution values that are associated with a particular N×N convolution and a particular set of image values and is to store each sum of 3×3 convolution values. The PLD is further to add each of the stored sums associated with a particular N×N convolution to the other stored sums associated with the particular N×N convolution to generate an N×N convolution value for each of the N×N convolutions.

The method and apparatus of the present invention allows for implementing large CNN's and provides lower cost and lower power than conventional systems in which the number of memory blocks required to frame a matrix from the input image and the number of multipliers is directly proportional to the size of the matrix.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 2 is a block diagram illustrating a method for performing N×N convolutions.

FIG. 3A-3F illustrate an example in which a 9×9 convolution operation is performed on 12 rows and 12 columns of image values with a stride of 1.

DETAILED DESCRIPTION OF THE INVENTION

Figure 1:
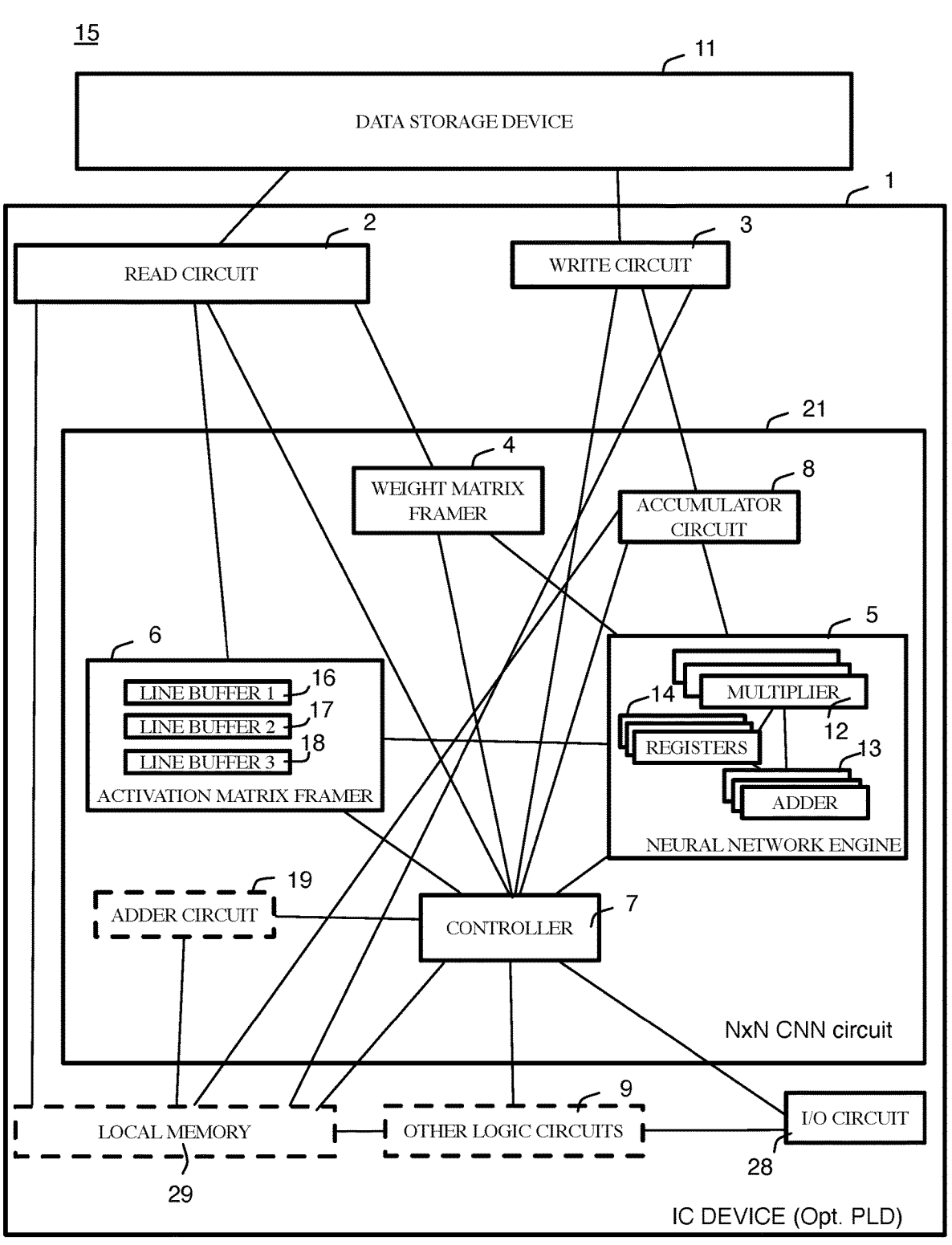
FIG. 1 is a system that includes an IC device and a data storage device that is coupled to the IC device.

FIG. 1 shows a system 15 that includes an IC device 1 in communication with a data storage device 11 that is a discrete data storage device such as a Dynamic Random Access Memory (DRAM) that is coupled to IC device 1 (e.g., by traces on a circuit board on which both data storage device 11 and IC device 1 are mounted). IC device 1 may be a PLD such as an FPGA, or an ASIC. IC device 1 includes a read circuit 2 to read data from data storage device 11, a write circuit 3 to write data into data storage device 11, an N×N CNN circuit 21, Input and Output (I/O) circuit 28, other logic circuits 9 and optionally includes local memory 29. Read circuit 2 and write circuit 3 are coupled to data storage device 11.

N×N CNN circuit 21 includes a weight matrix framer 4, a neural network engine 5, an activation matrix framer 6, a controller 7, an accumulator circuit 8 and an optional adder circuit 19. Controller 7 is coupled to read circuit 2, write circuit 3, weight matrix framer 4, neural network engine 5, activation matrix framer 6 and accumulator circuit 8, and is optionally coupled to I/O circuit 28, local memory 29, optional adder circuit 19 and other logic circuits 9. Activation matrix framer 6 is coupled to neural network engine 5 and to read circuit 2. Weight matrix framer 4 is further coupled to read circuit 2 and neural network engine 5. Write circuit 3 is further coupled to accumulator circuit 8 and to data storage device 11. Accumulator circuit 8 is further coupled to neural network engine 5. Optional local memory 29 is further coupled to accumulator circuit 8 to optional other logic circuits 9, to read circuit 2, to write circuit 3 and to optional adder circuit 19. I/O circuit 28 is further coupled to other logic circuits 9.

FIG. 2 illustrates a method 100 for performing N×N convolutions on an image file that includes lines of image values. The method includes receiving (101) a weights matrix for an N×N convolution neural network. In the present application weights matrixes having a size of N by N are referred to using the style "N×N." Accordingly, a matrix indicated herein as a "N×N" matrix has N rows and N columns.

In one example, the N×N weights matrix for the N×N convolution is stored in data storage device 11 by other devices that are coupled to data storage device 11 (not shown) and read circuit 2 receives the weights matrix by reading an N×N weights matrix for an N×N convolution stored on data storage device 11. Alternatively, the N×N weights matrix for the N×N convolution is received at I/O circuit 28. In one example, the N×N weights matrix for the N×N convolution is received at I/O circuit 28 from an external source and write circuit 3 stores the received image file in data storage device 11 or in local memory 29. Read circuit 2 obtains the N×N weights matrix for the N×N convolution by reading data storage device 11 or local memory 29.

The received N×N weights matrix is divided (102) into a plurality of 3×3 weights matrixes. If N is not an integer multiple of 3, then zeros are appended to the N×N weights matrix to make the matrix size an integer multiples of 3. For example, when a 4×4, 5×5 or 6×6 convolution is to be performed, the weights matrix received in step 101 is divided into four 3×3 weights matrixes. For 4×4 and 5×5 convolutions, zero values are added to the 4×4 or 5×5 weights matrixes so that the size of the resultant matrix is the next integer multiple of 3, which is 6×6 in the case of 4×4 or 5×5 matrices. Similarly, when the received matrix is a 7×7, 8×8 or 9×9 the received weights matrix is divided into nine 3×3 weights matrixes. For 7×7 and 8×8 convolutions, zero values added to the 7×7 and 8×8 weights matrixes so that the size of the resultant matrix is the next integer multiple of 3, which is 9×9 in the case of 7×7 or 8×8 matrices. When a 10×10, 11×11 or 12×12 convolution is to be performed, the weights matrix received in step 101 is divided into sixteen 3×3 weights matrixes. For the 10×10 and 11×11 convolutions, zero values are added to the 10×10 and 11×11 weights matrixes so that the size of the resultant matrix is the next integer multiple of 3 which is 12×12 in the case of 10×10 and 11×11 matrices. In FIG. 1, controller 7 divides the received weights matrix into the plurality of 3×3 weights matrixes, add zero weights as required, and to store the resulting plurality of 3×3 weights matrixes in data storage device 11, in local memory 29 or in weight matrix framer 4.

Configuration files for a 3×3 CNN are loaded (103) into an IC device to form a 3×3 CNN core in a neural network engine of the IC device. Controller 7 instructs read circuit 2 to read configuration files for the 3×3 CNN from data storage device 11 or local memory 29, and controller 7 loads the configuration files for the 3×3 CNN into neural network engine 5 to form the 3×3 CNN in neural network engine 5.

In FIG. 1, some of the configuration files for the 3×3 CNN can be loaded into neural network engine 5 and some configuration values for the 3×3 CNN and/or instructions from the configuration files can be loaded into the other components of N×N CNN circuit 21 (e.g., to configure the other components of N×N CNN circuit 21).

Figure 3A:
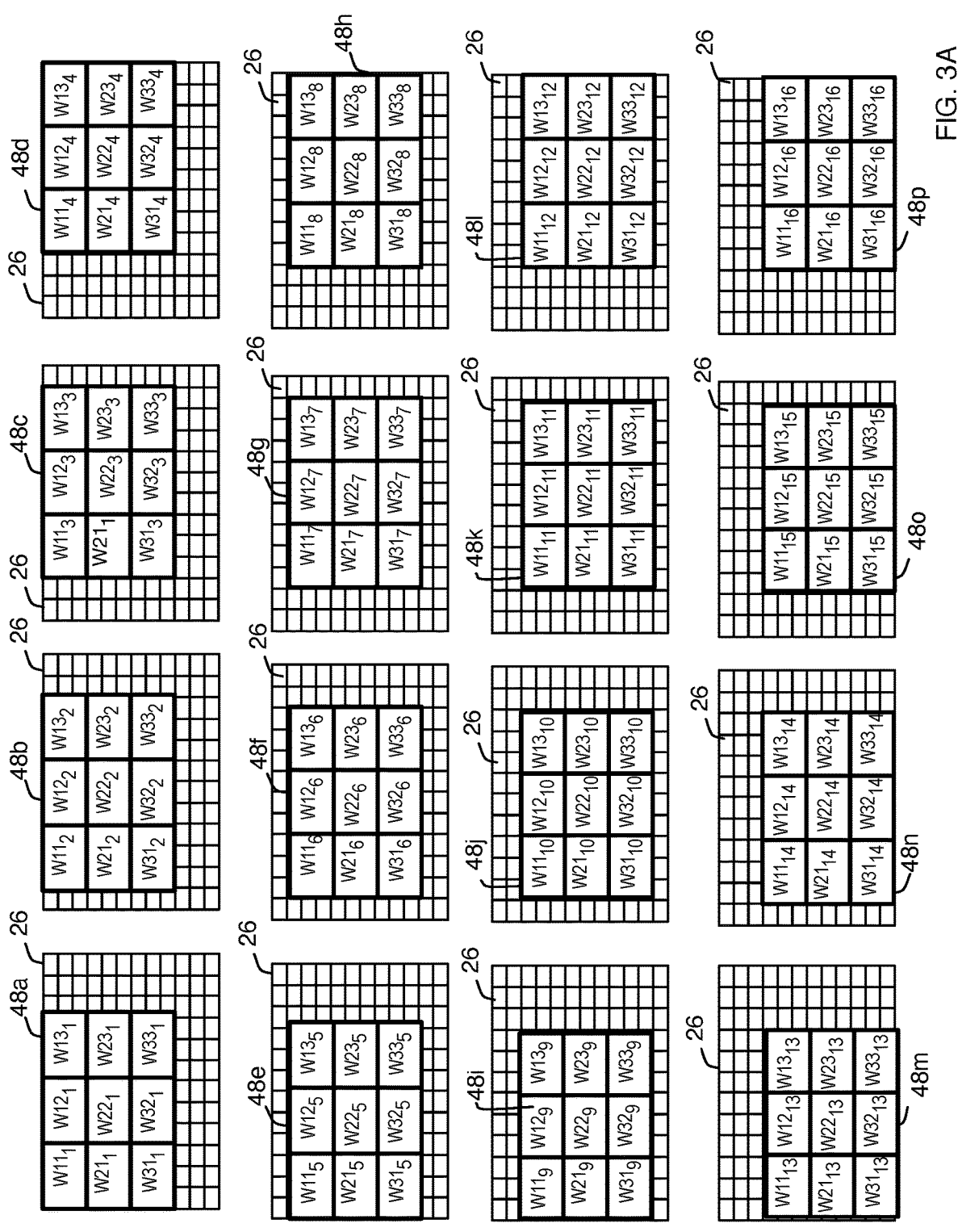

FIGS. 3A-3F illustrate an example (Example A) in which the steps of method 100 are used to perform a 9×9 convolution on an image file containing 12 rows and 12 columns of image values using a stride of 1. A weights matrix for a 9×9 convolution neural network is received in step 101 and is divided into 9 3×3 weights matrixes W11, W12, W13, W21, W22, W23, W31, W32 and W33 in step 102, where the 3×3 weight matrixes are illustrated in FIG. 3A with a first number indicating row and a second number indicating column. In this example, the 3×3 weight matrixes W11, W12, W13, W21, W22, W23, W31, W32 and W33 are stored in data storage device 11 or in local memory 29 and read by read circuit 2 and coupled to weight matrix framer 4 as required for the operation of weight matrix framer 4. Configuration files for a 3×3 CNN are loaded in step 103 into IC device 1 to form a 3×3 CNN core in neural network engine 5.

One or more lines of image values are read (104) from an image file. The term "image file", as used in the present application, includes all types of files that include values relating to an image, and includes, without limitation, Red Green Blue (RGB) image files, greyscale image files, Cyan Magenta Yellow Black (CMYK) image files, Hue Saturation and Lightness (HSL), Hue Saturation Value (HSV) image files and image files resulting from the performance of one or more activation functions (sometimes referred to as activation image files, activation maps or feature maps), and specifically includes video recognition, recommender systems, natural language processing and brain-computer interface and financial time series image files.

In FIG. 1 the image file that is to be processed using the N×N convolution is stored in data storage device 11 (or in local memory 29) by a user of system 15. In one example, the image file is stored in data storage device 11 by other devices that are coupled to data storage device 11 (not shown). In another example, the image file is received at I/O circuit 28 from an external source and write circuit 3 stores the received image file in data storage device 11 (or in in local memory 29) prior to performing step 104. In FIG. 1 read circuit 2 reads one or more lines of image values from the image file stored in data storage device 11 (or in local memory 29).

The one or more lines of image values are stored (105) in a buffer of the IC device as a set of image values. In one example the buffer is a three-line buffer and each set of image values stored in the three-line buffer consists of three lines of the image values and in iterations following the first iteration of step 105 additional lines of image values are stored in the 3-line buffer by overwriting one or more lines of image values previously stored in the three-line buffer.

Figure 3B:
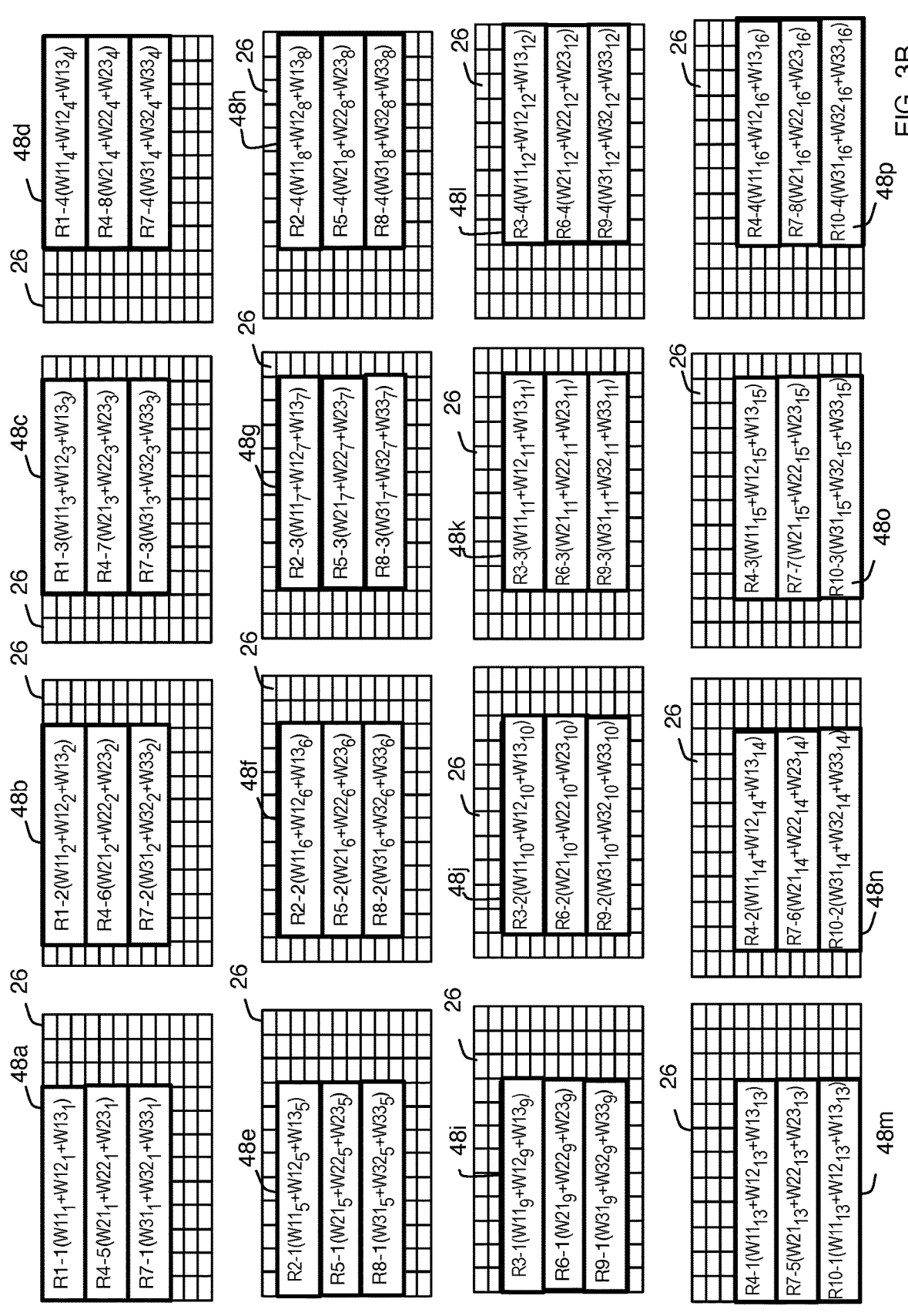
Figure 3C:
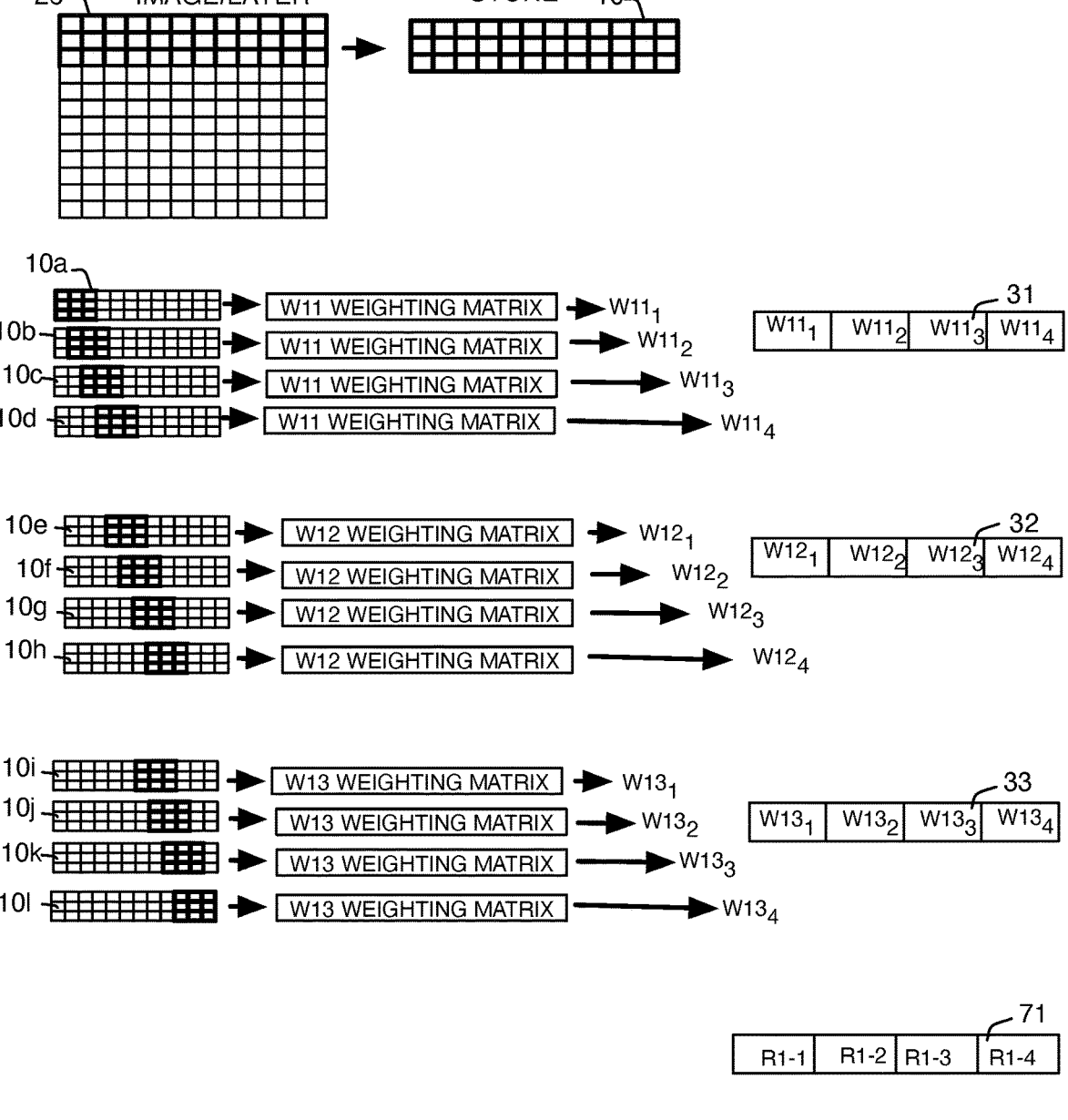
Figure 3F:
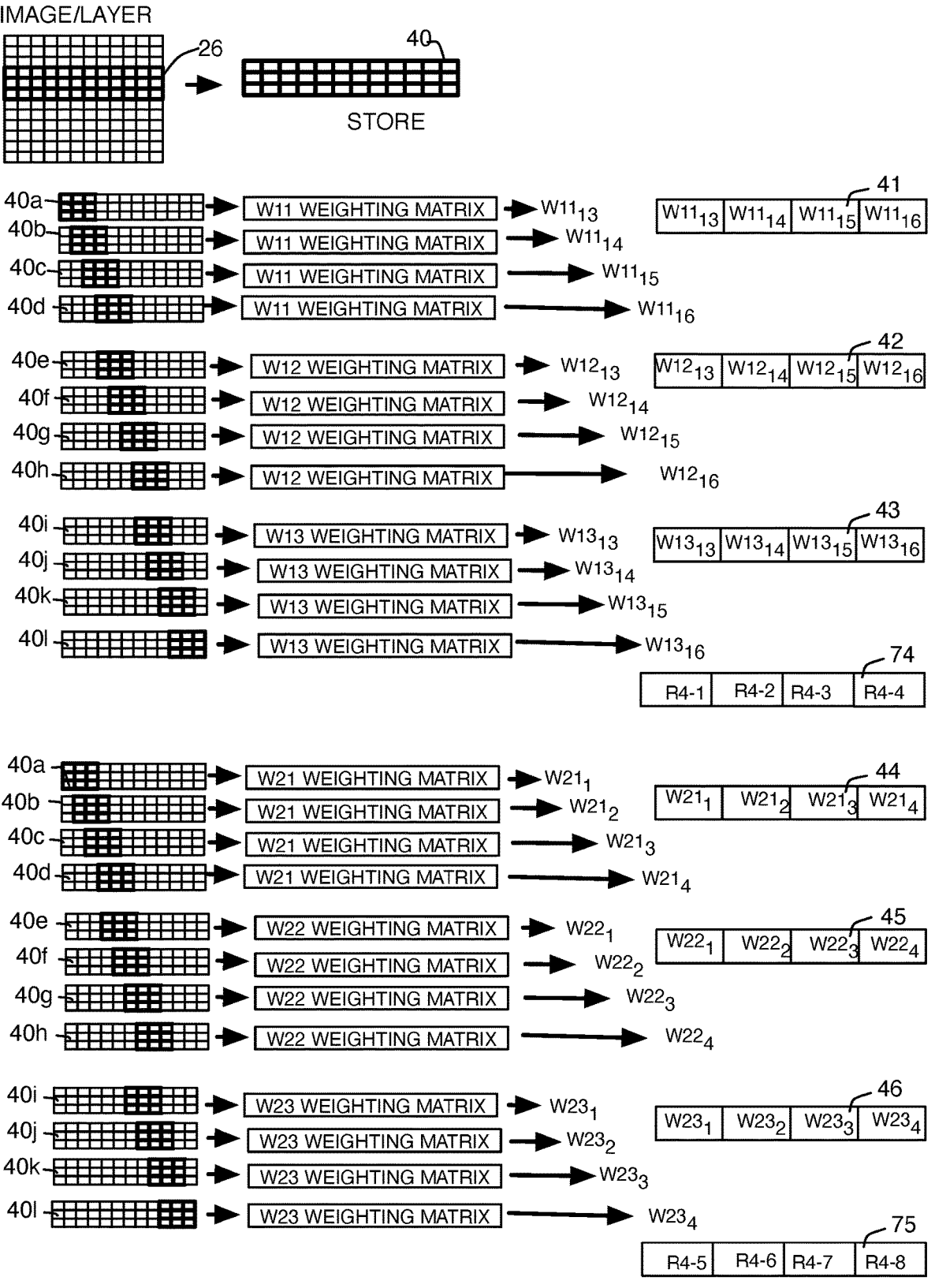

In the example of FIGS. 3A-3F, in step 104 a first line of the image file 26 is read and stored in line buffer 16 of FIG. 1, a second line of the image file is read and is stored in line buffer 17 and a third line of the image file is read and is stored in line buffer 18 to form a first set of image values 10 in line buffers 16-18, as illustrated in FIG. 3C. In the following discussion of the processing of image values stored in buffers 16-18, the first set of image values 10 (three lines in buffers 16-18) are illustrated as rectangles and the rows and columns of image values that are framed (e.g., by framer and output to neural network engine 5) are shown in bold and referenced with the labels 10a-101. In FIGS. 3D-3F instances of image values in line buffers 16-18 are illustrated in the same manner.

3×3 convolutions are performed (106) on the set of image values stored in the buffer. Each of the 3×3 convolutions includes: coupling weights values from one of the 3×3 weights matrixes into the neural network engine 5 of the IC device 1; loading a plurality of image values from the buffer into the neural network engine; and performing a 3×3 CNN operation of the CNN core to generate a 3×3 convolution value. The input to each 3×3 CNN operation thus includes the plurality of image values from the sets of image values and weights values from one of the 3×3 weights matrixes.

In FIG. 1, read circuit 2 reads the weights values of one or more of the 3×3 weights matrixes and couples the weights values to weight matrix framer 4; and weight matrix framer 4 loads the weights values from the 3×3 weights matrixes into neural network engine 5. The weights values of all of the 3×3 weights matrixes can be stored in a local memory of weight matrix framer 4 (e.g., registers within weight matrix framer 4), with weight matrix framer 4 operable to provide the weights values of each respective 3×3 weights matrix to neural network engine 5 as required to perform method 100. Alternatively, all of the 3×3 weights matrixes are stored in data storage device 11 (or local memory 29) and individual 3×3 weights matrixes are read by read circuit 2 and coupled to weight matrix framer 4 as required to perform method 100.

In FIG. 1 read circuit 2 is operable to read three lines of the image values that are to be processed using the CNN and to couple the read three lines of the image values to activation matrix framer 6. It is appreciated that, typically convolutions are processed on a row-by-row basis beginning with the first row. Accordingly, the first three lines will be the first three rows of the image file. However, alternatively, the convolution could be processed column-by-column, beginning with the first column. In the following discussion it will be assumed that processing will begin with the first row and proceed row-by-row.

Activation matrix framer 6 includes buffers store the set of three lines of image values, and activation matrix framer 6 loads image values from the set of image values into neural network engine 5. More particularly, activation matrix framer 6 includes a first line buffer 16 for storing a first line of image values, a second line buffer 17 for storing a second line of image values and a third line buffer 18 for storing a third line of image values. Line buffers 16-18 can be Static Random-Access Memory (SRAM) blocks that can be individually accessed by read circuit 2.

Activation matrix framer 6 couples three columns of the image values stored in line buffers 16-18 to neural network engine 5. More particularly, before each 3×3 CNN operation nine image values are loaded into the neural network engine 5, three from each of the line buffers 16-18. More particularly, activation matrix framer 6 is configured for loading three image values from the first line buffer, three image values from the second line buffer and three image values from the third line buffer into the neural network engine prior to each 3×3 CNN operation.

The input to each 3×3 CNN operation thus includes image values from one of the sets of image values and weights values from one of the 3×3 weights matrixes provided from weight matrix framer 4.

In FIG. 1, upon receiving the one of the 3×3 weights matrixes provided from weight matrix framer 4 and the image values from activation matrix framer 6 at neural network engine 5, neural network engine 5 performs a 3×3 CNN operation of the 3×3 CNN core to generate a convolution value.

In one example performing the 3×3 CNN operation further includes multiplying each of the image values received at the neural network engine 5 with a corresponding one of the weights values received at the neural network engine 5 to obtain a 3×3 CNN product. In one example the configuration files indicate one or more bias values (optionally received in step 103) and how the one or more bias values are to be added to one or more of the 3×3 CNN products to generate the 3×3 convolution value. In FIG. 1, one or more bias value is stored in data storage device 11 (or local memory 29) that is read by read circuit 2, and controller 7 is operable to load the one or more bias value into neural network engine 5. In one example, a set of bias values are added to the result of convolution. It is appreciated that N×N convolution does not require the use of bias values, or may require only a single bias value for each N×N convolution to be performed. In such instances a bias value is only provided for one of the 3×3 neural network operations on a particular N×N convolution.

In FIG. 1, neural network engine 5 includes: a plurality of parallel multipliers 12; a plurality of adders 13; and a plurality of registers 14 that are operably coupled together. Registers 14 include registers for receiving the image values from activation matrix framer 6, registers for receiving the weights values from weight matrix framer 4, and registers for intermediate products and/or sums. Each of parallel multipliers 12 is coupled to one of the registers 14 for receiving an image value and to one of the registers 14 for receiving a weights value and the output of each of the parallel multipliers 12 (a 3×3 CNN product) is coupled to a respective one of the adders 13. Neural network engine 5 can include nine parallel multipliers 12 that multiply respective image values with weight matrix values and couple the product to adders 13. Adders 13 add the outputs from multipliers 12 together to obtain a single 3×3 convolution value.

Neural network operations are only performed on certain columns of the input image values for each 3×3 convolution of each 9×9 convolution $48a$-$48p$ during the processing of each set of image values. FIG. 3A shows examples of the rows and columns of image file 26 that the 3×3 weights matrixes W11, W12, W13, W21, W22, W23, W31, W32 and W33 operate on to perform each 9×9 convolution $48a$-$48p$. For example in FIG. 3A, the weights matrix $W11_4$ does not operate on the last 6 columns of the image values.

In the example of FIGS. 3A-3F, in step 106 3×3 weights matrix W11 and rows/columns of image values $10a$ (the first three columns of the first three rows) in set of image values 10 are loaded in step 106 into the neural network engine 5 and a first 3×3 neural network operation is performed using as input to the neural network operation the image values in the first three rows and columns in line buffers 16-18 and 3×3 weights matrix W11 to generate 3×3 convolution value $W11_1$ as illustrated in FIG. 3C.

All 3×3 convolution values that are associated with a particular N×N convolution and a particular set of image values are summed (107) and each sum of 3×3 convolution values is optionally stored (108). In FIG. 1, accumulator circuit 8 receives the convolution values from neural network engine 5 and sums together all 3×3 convolution values that are associated with a particular convolution and a particular set of image values. The arrays are stored (108) by coupling the sums of convolution values (e.g., as an array) to write circuit 3 that stores the sums of convolution values (e.g., the arrays) in data storage device 11. Alternatively, write circuit 3 stores the arrays in local memory 29.

The output of neural network operations is illustrated below as being combined to form an "array." This is not intended to be limiting, but rather is a convenient way to illustrate a series of values that are associated with each other, whether those values are stored in the same storage location, sequentially, as comma separated values, or in non-sequential storage locations. The representation of the output as an "array" containing a single line of numerical values is used for simplicity of illustration, and the results of the neural network operations can also be represented as a corresponding matrix, or simply as individual numerical values.

Steps 106-108 are repeated (109) until 3×3 CNN operations have been performed on all columns of the set of image files.

In the example of FIGS. 3A-3F, the process continues to the next column and a 3×3 convolution is performed by loading rows/columns of image values $10b$ (the second through fourth columns of the first three rows of image 26 in line buffers 16-18— associated with convolution $48b$) and 3×3 weights matrix W11 into neural network engine 5 and performing a CNN operation to generate 3×3 convolution values $W11_2$. A third convolution operation is performed by loading rows/columns of image values $10c$ (the third through fifth columns of the first three rows of image 26 in line buffers 16-18—associated with convolution $48c$) and weights matrix W11 into neural network engine 5 and performing a 3×3 CNN operation to generate 3×3 convolution value $W11_3$. A fourth convolution operation is performed by loading rows/columns of image values $10d$ (the fourth through sixth columns of the first three rows of image 26 in line buffers 16-18—associated with convolution $48d$) and 3×3 weights matrix W11 into neural network engine 5 and performing a 3×3 CNN operation to generate 3×3 convolution values $W11_4$. The output from the 3×3 convolution operations utilizing 3×3 weights matrix W11 may be represented as array 31. Subsequent columns do not operate on 3×3 weights matrix W11 as illustrated by the positioning of weights matrixes W11 in 9×9 convolutions $48a$-$d$ of FIG. 3A, so the process moves to the next weights matrix W12. 3×3 weights matrix W12 and rows/columns of image values $10e$, associated with convolution $48a$, are loaded into neural network engine 5 and a CNN operation is performed to generate 3×3 convolution value $W12_1$. 3×3 weights matrix W12 and rows/columns of image values $10f$, associated with convolution $48b$, are loaded into neural network engine 5 and a 3×3 CNN operation to generate 3×3 convolution value $W12_2$. 3×3 weights matrix W12 and rows/columns of image values $10g$, associated with convolution $48c$, are loaded into neural network engine 5 and a 3×3 CNN operation is performed using 3×3 weights matrix W12 to generate convolution value $W12_3$. 3×3 weights matrix W12 and rows/columns of image values $10h$, associated with convolution $48d$, are loaded and a 3×3 CNN operation is performed to generate convolution values $W12_4$. The output from the processing 3×3 weights matrix W12 can be represented as array 32. The process continues with the loading of 3×3 weights matrix W13 and rows/columns of image values $10i$, —associated with convolution $48a$, into neural network engine 5 and a 3×3 CNN operation is performed to generate 3×3 convolution value $W13_1$. 3×3 weights matrix W13 and rows/columns of image values $10j$, associated with convolution $48b$, are loaded into neural network engine 5 and a 3×3 CNN operation is performed to generate 3×3 convolution value $W13_2$. 3×3 weights matrix W13 and rows/columns of image values $10k$, associated with convolution $48c$, are loaded into neural network engine 5 and a 3×3 CNN operation is performed to generate 3×3 convolution values $W13_3$. 3×3 weights matrix W13 and rows/columns of image values 101, associated with convolution $48d$, are loaded into neural network engine 5 and a 3×3 CNN operation is performed to generate convolution value $W13_4$. The output from the 3×3 convolutions performed using weights matrix W13 can be represented as array 33.

In the example of FIGS. 3A-3F, at step 107, all 3×3 convolution values that are associated with a particular convolution and set of image values 10 are summed together by accumulator circuit 8 as they are output. More particularly, convolution values from neural network operations on 3×3 weights matrix W11, W12 and W13, for each convolution, are summed by accumulator circuit 8. The sum of neural network operations on the set of image values 10 is represented by array 71 that includes the sum values R1-1 (the sum of the convolution values associated with set of image values 10 and the convolution 48$a$), R1-2 (the sum of the convolution values associated with set of image values 10 and the convolution 48$b$), R1-3 (the sum of the convolution values associated with set of image values 10 and the convolution 48$c$) and R1-4 (the sum of the convolution values associated with set of image values 10 and the convolution 48$d$). Array 71 is stored in step 108, in which: R1-1=$W11_1$+$W12_1$+$W13_1$; R1-2=$W11_2$+$W12_2$+$W13_2$; R1-3=$W11_3$+$W12_3$+$W13_3$; and R1-4=$W11_4$+$W12_4$+$W13_4$. At this point CNN operations have been performed on all columns of the first 3 rows. In this example N×N convolutions 48$a$-48$p$ are performed by performing individual 3×3 convolutions, with each calculation of a 3×3 convolution indicated using a subscript corresponding to the particular N×N convolution. For example, referring now to FIG. 3A, for first N×N convolution 48$a$, each of the corresponding 3×3 weights matrixes have a subscript of 1, indicting it is a first 3×3 calculation of that particular 3×3 weights matrix, and weights matrixes 48$b$, that correspond to a second N×N convolution have a subscript of 2, indicating a second 3×3 CNN calculation of the particular matrix. The sums from performing steps 106-107 on the first set of image values are illustrated as R1-1 for N×N convolution 48$a$, R1-2 for N×N convolution 48$b$, R1-3 for N×N convolution 48$c$ and R1-4 for N×N convolution 48$d$.

Steps 104-109 are repeated (110) until all of the lines of image values in the image file have been processed. In one example a stride for the N×N convolution is received in step 101, and the repeating the reading one or more lines of image values of step 104 includes reading a number of additional lines corresponding to the stride.

In the example shown in FIGS. 3A-3F, in the second iteration of steps 104-109, the process moves to the next row. Operations on the next row are illustrated by convolutions 48$e$-48$h$ shown in FIGS. 3A-3B. The fourth row of image values in image file 26 is read in step 104 and loaded into one of line buffers 16-18, while the first row of image values is discarded from one of line buffers 16-18 to form a set of image values 20 in line buffers 16-18 shown in FIG. 3D. 3×3 weights matrix W11 is loaded into neural network engine 5. With 3×3 weights matrix W11 loaded: the 3×3 CNN operation on rows/columns of image values 20$a$, associated with convolution 48$e$, of step 107 generates 3×3 convolution value $W11_5$; the 3×3 CNN operation on rows/columns of image values 20$b$, associated with convolution 48$f$, generates 3×3 convolution value $W11_6$; the 3×3 CNN operation on rows/columns of image values 20$c$, associated with convolution 48$g$, generates 3×3 convolution value $W11_7$; and the 3×3 CNN operation on rows/columns of image values 20$d$, associated with convolution 48$h$, generates 3×3 convolution value $W11_8$. The output from the processing of 3×3 weights matrix W11 can be represented as array 34.

The process continues with the loading of 3×3 weights matrix W12 into neural network engine 5. With 3×3 weights matrix W12 loaded: the 3×3 CNN operation on rows/columns of image values 20$e$, associated with convolution 48$e$, in step 106 generates convolution value $W12_5$; the 3×3 CNN operation on rows/columns of image values 20$f$, associated with convolution 48$f$, generates convolution value $W12_6$; the 3×3 CNN operation on rows/columns of image values 20$g$, associated with convolution 48$g$, generates convolution value $W12_7$; and the CNN operation on rows/columns of image values 20$h$, associated with convolution 48$h$, generates convolution values $W12_8$. The output from the processing 3×3 weights matrix W12 can be represented as array 35. In step 108 3×3 convolution values from 3×3 convolution operations on 3×3 weights matrixes W11 and W12 are summed by accumulator circuit 8.

The process continues with 3×3 convolutions using weights matrix W13. With 3×3 weights matrix W13 loaded into neural network engine 5: in step 106 the 3×3 CNN operation on rows/columns of image values 20$i$, associated with convolution 48$e$, generates convolution value $W13_5$; the 3×3 CNN operation on rows/columns of image values 20$j$, associated with convolution 48$f$, generates convolution value $W13_6$; the CNN operation on rows/columns of image values 20$k$, associated with convolution 48$g$, generates convolution value $W13_7$; and the CNN operation on rows/columns of image values 201, associated with convolution 48$h$, generates 3×3 convolution value $W13_8$. The output from the processing 3×3 weights matrix W13 can be represented as array 36. The sum of neural network operations on the set of image values 20 (107) is represented by array 72 that includes the sum values R2-1 (the sum of the convolution values associated with set of image values 20 and the convolution 48$e$), R2-2 (the sum of the convolution values associated with set of image values 20 and the convolution 48$f$), R2-3 (the sum of the convolution values associated with set of image values 20 and the convolution 48$g$) and R2-4 (the sum of the convolution values associated with set of image values 20 and the convolution 48$h$). Array 72 is stored in step 108, in which: R2-1=$W11_5$+$W12_5$+$W13_5$; R2-2=$W11_6$+$W12_6$+$W13_6$; R2-3=$W11_7$+$W12_7$+$W13_7$; and R2-4=$W11_8$+$W12_8$+$W13_8$.

In the next iteration of steps 104-109 the process moves to the third row, illustrated by the first three rows of convolutions 48$i$-481 in FIG. 3A, with the fifth row of image values loaded into one of the line buffers 16-18, while the second line of image values in image 26 is discarded to form a set of image values 30 in line buffers 16-18. As shown in FIG. 3E, 3×3 convolution operations are performed on set of image values 30 using 3×3 weights matrix W11 on rows/columns of image values 30$a$, 30$b$, 30$c$ and 30$d$ to generate 3×3 convolution values $W11_9$, $W11_{10}$, $W11_{11}$, $W11_{12}$, that may be represented as array 37; performed using 3×3 weights matrix W12 on rows/columns of image values 30$e$, 30$f$, 30$g$ and 30$h$ to generate 3×3 convolution values $W12_9$, $W12_{10}$, $W12_{11}$, $W12_{12}$, that may be represented as array 38 and performed using 3×3 weights matrix W13 on rows/columns of image values 30$i$, 30$j$, 30$k$ and 30$l$ to generate 3×3 convolution value $W13_9$, $W13_{10}$, $W13_{11}$, $W13_{12}$ that may be represented as array 39. The outputs from neural network operations on rows 3-5 are summed together (107) to generate stored array 73 (that includes sums R3-1, R3-2, R3-3 and R3-4) in which: R3-1=$W11_9$+$W12_9$+$W13_9$; R3-2=$W11_{10}$+$W12_{10}$+$W13_{10}$; R3-3=$W11_{11}$+$W12_{11}$+$W13_{11}$; R3-4=$W11_{12}$+$W12_{12}$+$W13_{12}$.

In the next iteration of steps 104-109 the process moves to the fourth row, illustrated by the first three rows of 9×9 convolutions 48$m$-48$p$ in FIG. 3A, with the sixth row of image values from image file 26 loaded into one of line buffers 16-18, while the third line of image values 26 is discarded to form a set of image values 40 in buffers 16-18. Referring now to FIG. 3F, 3×3 CNN operations are performed on set of image values 40 using weights matrix W11 on rows/columns of image values 40$a$, 40$b$, 40$c$ and 40$d$ to generate output $W11_{13}$, $W11_{14}$, $W11_{15}$, $W11_{16}$, that may be represented as array 41; performed using 3×3 weights matrix W12 on rows/columns of image values $40e$, $40f$, $40g$ and $40h$ to generate 3×3 convolution values $W12_{13}$, $W12_{14}$, $W12_{15}$, $W12_{16}$, that may be represented as array 42; and performed using 3×3 weights matrix W13 on rows/columns of image values $40i$, $40j$, $40k$ and $40l$ to generate 3×3 convolution values $W13_{13}$, $W13_{14}$, $W13_{15}$, $W13_{16}$, that may be represented as array 43. The outputs from neural network operations set of image values 40 for convolutions $48m$-$p$ are summed together to generate stored array 74 (that includes R4-1, R4-2, R4-3 and R4-4) that is stored in step 108; where R4-1=$W11_{13}$+$W12_{13}$+$W13_{13}$; R4-2=$W11_{14}$+$W12_{14}$+$W13_{14}$; R4-3=$W11_{15}$+$W12_{15}$+$W13_{15}$; and R4-4=$W11_{16}$+$W12_{16}$+$W13_{16}$. (e.g. stored in local memory 29 or data storage device 11).

Neural network operations are performed using weights matrix W21 on rows/columns of image values $40a$-$40d$ to generate 3×3 convolution values $W21_1$-$W21_4$, that may be represented as array 44; neural network operations performed using weights matrix W22 on rows/columns of image values $40e$-$40h$ to generate 3×3 convolution value $W22_1$-$W22_4$, that may be represented as array 45 and neural network operations performed using weights matrix W23 on rows/columns of image values $40i$-$40l$ to generate 3×3 convolution values $W23_1$-$W23_4$, that may be represented as array 46. The 3×3 convolution values from 3×3 CNN operations on set of image values 40 and convolutions $48a$-$d$ are summed together and stored (108) as array 75 (that includes sums R4-5, R4-6, R4-7 and R4-8), where: R4-5=$W21_1$+$W22_1$+$W23_1$; R4-6=$W21_2$+$W22_2$+$W23_2$; R4-7=$W21_3$+$W22_3$+$W23_3$; and R4-8=$W21_4$+$W22_4$+$W23_4$. Similarly R7-1, R7-2, R7-3 and R7-4 are computed.

In the example of FIGS. 3A-3F, steps 104-109 continue to be repeated to process subsequent rows until all rows and columns have been processed. FIG. 3B illustrates how the values generated from the summation of neural network operations in step 108 map to each convolution $48a$-$48p$, with the values R1-1 through R10-4 stored in local memory 29 or data storage device 11.

Each of the stored sums associated with a particular N×N convolution is added to the other stored sums associated with the particular N×N convolution (111) to generate an N×N convolution value for each of the N×N convolutions.

In one example the adding each of the sums of step 111 is performed using a dedicated adder circuit. In FIG. 1, optional adder circuit 19 adds the sums.

In one example neural network operations are performed on the sums associated with a particular convolution to add the sums in step 111. More particularly, a plurality of the sums associated with a particular convolution and a weights matrix that includes weights values having a value of 1 are coupled to the neural network engine 5, and a neural network operation is performed so as to multiply each of the sums associated with a particular convolution with 1 and add the resulting products together to obtain the N×N convolution value. In this example, IC device 1 does not include dedicated circuitry for adding the sums associated with a particular convolution together (e.g., does not include adder circuit 19), but rather neural network engine 5 is used for performing the adding of step 111. In this example, weight matrix framer 4 couples to neural network engine 5 weights values having a value of "1" and read circuit 2 reads the sums associated with a particular N×N convolution and stores them into buffers 16-18 of activation matrix framer 6. Activation matrix framer 6 couples the sums associated with a particular N×N convolution to neural network engine 5, that in turn multiplies each of the sums associated with the particular convolution with 1 and adds the resulting products together to obtain the respective N×N convolution value.

The N×N convolution values are optionally stored (112). The N×N convolution values from step 111 may be in the form of individual values, comma separated values, a vector or a matrix that is stored by write circuit 3 in data storage device 11. Alternatively, accumulator circuit 8 stores the N×N convolution values in local memory 29 so that they can be accessed by other logic circuits 9. The N×N convolution values may also be output via I/O circuit 28.

When IC device 1 is a PLD, programming of the PLD forms N×N CNN circuit 21 that is coupled to other logic circuits 9 of the PLD. Furthermore, the PLD can be programmed as a single fixed-size N×N CNN having a predetermined size and predetermined weights values. The fact that N×N CNN circuit 21 is not a full N×N CNN may be transparent to the user such that the user is unaware that the N×N CNN circuit 21 processes convolutions using 3×3 convolutions.

Steps 101-112 can also be performed after programming the PLD. More particularly, after programming of the PLD, the user may provide a weights matrix in step 101, the image file and optionally the stride. IC device 1 is then operable to perform steps 103-109 and optionally step 111.

Alternatively, IC device 1 can be a variable-size CNN (e g, a PLD configured to perform any size of convolution), with the size of the CNN indicated along with the stride in step 101 and coupled to controller 7. Controller 7 is then operable to configure the other components of N×N CNN circuit 21 to perform the correct convolution. The term "stride" as used in the present application refers to the number of rows or columns between adjoining convolutions.

Figure 4A:
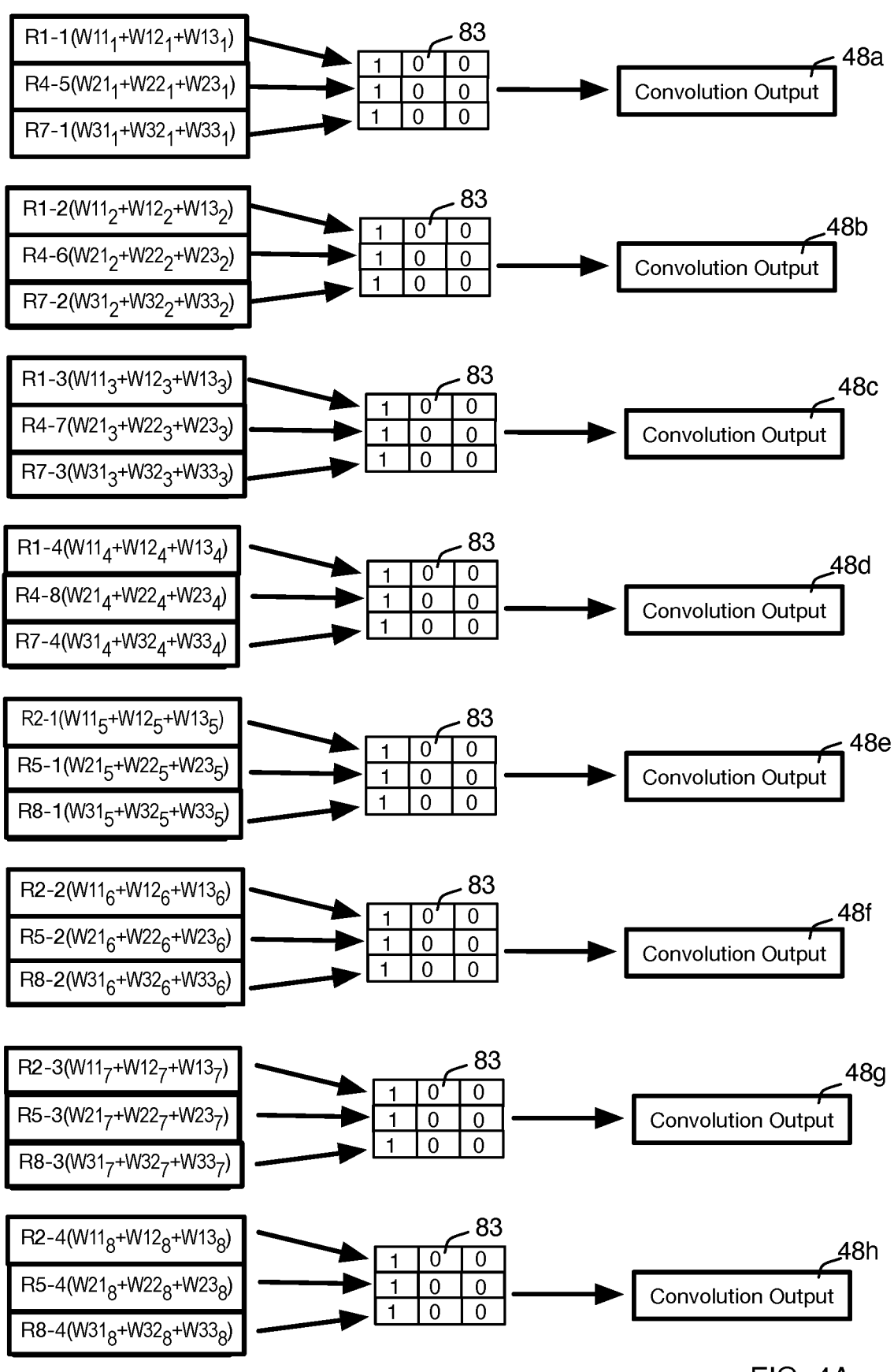
FIG. 4A-4B are flow diagrams illustrating use of a neural network engine to add the row vectors from the example shown in FIGS. 3A-3F.
Figure 4B:
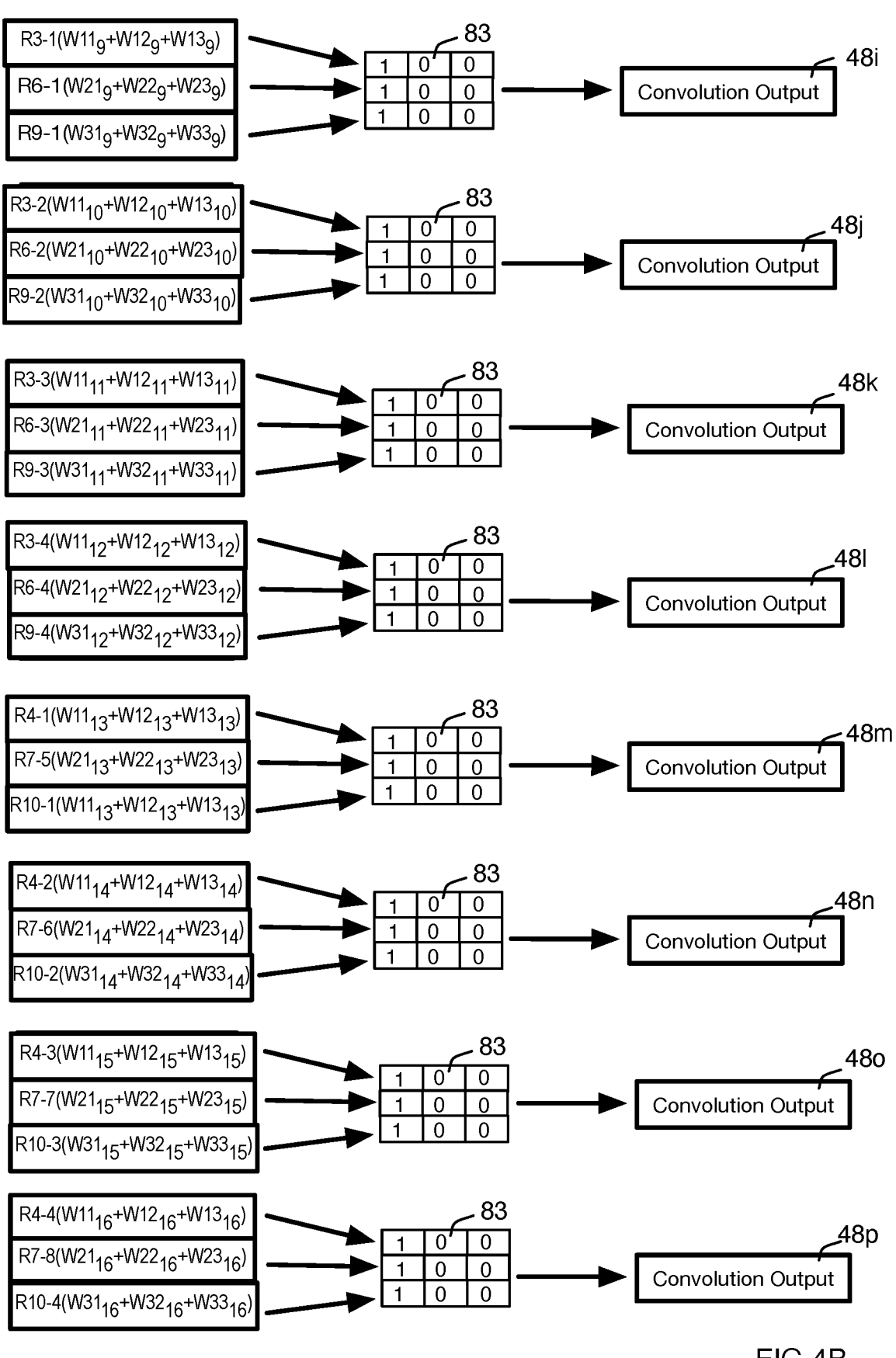

In step 111 optional adder circuit 19 can be used to add the stored sums to generate an N×N convolution value for each of the N×N convolutions for each of convolutions $48a$-$48p$. However, using a dedicated circuit to perform the addition adds to the number of gates and the complexity of the N×N CNN circuit 21. In one example, neural network engine 5 is used to perform the addition and N×N CNN circuit 21 does not include an adder circuit 19. More particularly, row vectors to be added are input to neural network engine 5 along with a weights matrix having weights values of a first column having a value of "1" and weights values of other columns having a value "0" as illustrated in FIG. 4A-4B. For large matrixes with more than three sums to be added together, the N×N convolution values output from the neural network operations can be fed back into the neural network 5 as many times as necessary to obtain as output a single N×N convolution value for each of the N×N convolutions to be computed.

In the example illustrated in FIGS. 4A-4B, sums R4-5 through R10-4 are generated in the same manner as the above example relating to sums R1-1 through R 3-4

In the example illustrated in FIGS. 4A-4B, for sums R1-1, R4-5 and R7-1 (that are generated in the same manner as in the examples shown above) weights matrix 83 is loaded into neural network engine 5 to generate the 9×9 convolution values for convolution $48a$; sums R1-2, R4-6 and R7-2 and weights matrix 83 are loaded into neural network engine 5 to generate the 9×9 convolution values for convolution $48b$. Similarly, neural network operations are performed using weights matrix 83 in which: sums R1-3, R4-7 and R7-3 generate the 9×9 convolution values for convolution $48c$; sums R1-4, R4-8 and R7-4 generate the 9×9 convolution values for convolution $48d$; sums R2-1, R5-1 and R8-1 generate the 9×9 convolution values for convolution $48e$; sums R2-2, R5-2 and R8-2 generate the 9×9 convolution values for convolution 48*f*; sums R2-3, R5-3 and R8-3 generate the 9×9 convolution values for convolution 48*g*; and sums R2-4, R5-4 and R8-4 generate the 9×9 convolution values for convolution 48*h*.

Referring now to FIG. 4B, neural network operations are performed using weights matrix 83 in which: sums R3-1, R6-1 and R9-1 generate the 9×9 convolution values for convolution 48*i*; sums R3-2, R6-2 and R9-2 generate the 9×9 convolution values for convolution 48*j*; sums R3-3, R6-6 and R9-3 generate the 9×9 convolution values for convolution 48*k*; sums R3-4, R6-4 and R9-4 generate the 9×9 convolution values for convolution 48*l*; sums R4-1, R7-5 and R10-1 generate the 9×9 convolution values for convolution 48*m*; and sums R4-2, R7-6 and R10-2 generate the 9×9 convolution values for convolution 48*n*; sums R4-3, R7-7 and R10-3 generate the 9×9 convolution values for convolution 48*o*; and sums R4-4, R7-8 and R10-4 generate the 9×9 convolution values for convolution 48*p*.

The methods and apparatus of the present invention reduce the number of memory blocks, registers for convolution weights and multipliers required for performing N×N convolutions of large matrixes. For example, in embodiments of the present invention an 11×11 convolution can be computed using only 3 memory blocks (one for each line buffer 16-18), 9 registers for convolution weights matrix, 9 registers for weights values, 9 parallel multipliers. Accordingly, the method and apparatus disclosed herein allows for running large N×N convolutions at lower cost and lower power than current systems that require N parallel multipliers, N×N registers for convolution weights values and a corresponding number of adders.

What is claimed is:

1. A method for performing an N×N convolution on an image file that includes lines of image values, where N is greater than 3, the method comprising:

receiving a weights matrix for an N×N convolution neural network (CNN) at an integrated circuit device or at a data storage device coupled to the integrated circuit device;

dividing the weights matrix, by circuitry of the integrated circuit device, into a plurality of 3×3 weights matrixes;

loading, by circuitry of the integrated circuit device, configuration files for a 3×3 Convolutional Neural Network (CNN) into the integrated circuit device to form a 3×3 CNN core in a neural network engine of the integrated circuit device;

reading one or more lines of image values;

storing, by circuitry of the integrated circuit device, three lines of the read image values in a three-line buffer of the integrated circuit device as a first set of image values, a plurality of the 3×3 weight matrixes associated with the first set of image values;

performing 3×3 convolutions on the first set of image values by:

coupling weights values, by circuitry of the integrated circuit device, from one of the 3×3 weights matrixes into the neural network engine;

loading, by circuitry of the integrated circuit device, 3 rows and 3 columns of the first set of image values from the three-line buffer into the neural network engine;

performing, by circuitry of the neural network engine, a 3×3 CNN operation of the CNN core, utilizing the loaded image values and coupled weights values from one of the 3×3 weights matrixes as input to the 3×3 CNN operation to generate a 3×3 convolution value;

repeating the loading 3 rows and 3 columns of the first set of image values into the neural network engine and the performing a 3×3 CNN operation of the CNN core using the weights values from the respective one of the 3×3 weights matrixes as input to the 3×3 CNN operation, until all columns in the first set of image values have been processed; and repeating the coupling weights values the loading 3 rows and 3 columns of the first set of image values into the neural network engine and the performing a 3×3 CNN operation of the CNN core, until all columns in the first set of image values and all 3×3 weights matrixes associated with the first set of image values have been processed summing together, by circuitry of the integrated circuit device, the 3×3 convolution values that are associated with a particular N×N convolution and a particular set of image values to obtain a sum of 3×3 convolution values for respective N×N convolutions;

storing, by circuitry of the integrated circuit device, the sums of 3×3 convolution values on the data storage device or on a local memory of the integrated circuit device;

repeating, by circuitry of the integrated circuit device, the reading, the storing of three lines of the read image values to store respective additional sets of image values in the three-line buffer, the performing 3×3 convolutions, the summing and the storing the sums, until all columns in respective additional sets of image values have been processed and all lines of image values in the image file have been processed; and adding, by circuitry of the integrated circuit device, respective sums of 3×3 convolution values associated with a particular N×N convolution to other sums of 3×3 convolution values associated with the particular N×N convolution to generate an N×N convolution value for the respective N×N convolution.

2. The method of claim 1 further comprising storing respective N×N convolution values on the local memory of the integrated circuit device or on the data storage device.

3. The method of claim 1 wherein the storing three lines of the read image values in the three-line buffer after the first set of image files have been stored comprises overwriting one line of image values previously stored in the three-line buffer.

4. The method of claim 1 wherein the configuration files indicate one or more bias values and how the one or more bias values are to be added to a 3×3 CNN product to generate the respective 3×3 convolution value.

5. The method of claim 1, wherein a stride is received for the N×N convolution, and wherein the repeating the reading includes reading a number of lines of image values corresponding to the stride.

6. The method of claim 1 wherein the adding, by circuitry of the integrated circuit device, respective sums of 3×3 convolution values associated with the particular N×N convolution to other sums of 3×3 convolution values associated with the particular N×N convolution comprises adding respective sums using a dedicated adder circuit of the integrated circuit device.

7. The method of claim 1 wherein the adding, by circuitry of the integrated circuit device, respective sums of 3×3 convolution values associated with the particular N×N convolution to other sums of 3×3 convolution values associated with the particular N×N convolution comprises performing, at the neural network engine, neural network operations on the respective sums of 3×3 convolution values associated with the particular N×N convolution.

8. The method of claim 1 wherein the adding, by circuitry of the integrated circuit device, respective sums of 3×3 convolution values associated with the particular N×N convolution to other sums of 3×3 convolution values associated with the particular N×N convolution comprises:

coupling to the neural network engine, by circuitry of the integrated circuit device, respective sums of 3×3 convolution values associated with the particular convolution and a weights matrix that includes weights values of a first column having a value of "1" and weights values of other columns having a value of "0"; and performing a neural network operation of the neural network engine so as to multiply respective sums of 3×3 convolution values coupled to the neural network engine with 1 and add the resulting products together to generate the N×N convolution value for respective N×N convolutions.

9. An integrated circuit device comprising:

a read circuit, circuitry of the read circuit to read one or more lines of image values from an image file and to perform a read to obtain a weights matrix for an N by N convolution neural network (CNN), where N is greater than 3;

an N×N CNN circuit comprising:

a neural network engine, circuitry of the neural network engine to perform neural network operations;

a controller coupled to the neural network engine and the read circuit, circuitry of the controller to divide the weights matrix into a plurality of 3×3 weights matrixes and load configuration files for a 3×3 CNN into the integrated circuit device to form a 3×3 CNN core in the neural network engine;

a weight matrix framer circuit coupled to the read circuit and to the neural network engine, circuitry of the weight matrix framer circuit to load the weights values of one of the 3×3 weights matrixes into the neural network engine;

an activation matrix framer circuit coupled to the read circuit and to the neural network engine, the activation matrix framer circuit including a three-line buffer to store three lines of the read image values as a first set of image values, circuitry of the activation matrix framer circuit to load 3 rows and 3 columns of image values from the first set of image values into the neural network engine, wherein, upon receiving the weights values and the image values, circuitry of the neural network engine is to perform a 3×3 CNN operation of the 3×3 CNN core using the loaded image values and loaded weights values as input to the 3×3 CNN operation to generate a 3×3 convolution value, wherein the activation matrix framer circuit to repeat the loading 3 rows and 3 columns of the first set of image values into the neural network engine and the neural network engine is to repeat the performing a 3×3 CNN operation of the CNN core, until all columns in the first set of image values have been processed, and wherein the weight matrix framer circuit is to repeat the loading the weights values of one of the 3×3 weights matrixes into the neural network engine, the activation matrix framer circuit is to repeat the loading 3 rows and 3 columns of the first set of image values into the neural network engine and the neural network engine is to repeat the performing a 3×3 CNN operation of CNN core, until all columns in the first set of image values and all 3×3 weights matrixes associated with the first set of image values have been processed; and an accumulator circuit coupled to the neural network engine, circuitry of the accumulator circuit to sum together the 3×3 convolution values that are associated with a particular N×N convolution and associated with a particular set of image values and to store the sums of 3×3 convolution values on the data storage device or on a local memory of the integrated circuit device;

wherein the read circuit is to repeat the reading one or more lines of image values, the activation matrix framer circuit is to repeat the storing of three lines to store respective additional sets of image values in the three line buffer, the weight matrix framer circuit is to repeat the loading the weights values of one of the 3×3 weights matrixes, the neural network engine is to repeat the performing a 3×3 CNN operation and the accumulator circuit is to repeat the summing and the storing the sum, until all columns in respective additional sets of image values have been processed and all lines of image values in the image file have been processed, and wherein circuitry of the integrated circuit device is further to add sums of 3×3 convolution values associated with a particular N×N convolution to other sums of 3×3 convolution values associated with the particular N×N convolution to generate an N×N convolution value for respective N×N convolutions.

10. The integrated circuit device of claim 9, wherein the three-line buffer includes a first line buffer to store a first line of image values from the respective image file, a second line buffer to store a second line of image values from the respective image file and a third line buffer to store a third line of image values from the respective image file, the activation matrix framer circuit for loading three image values from the first line buffer, three image values from the second line buffer and three image value from the third line buffer into the neural network engine prior to respective 3×3 CNN operations.

11. The integrated circuit device of claim 9 further comprising an adder circuit coupled to the accumulator circuit for adding respective sums of 3×3 convolution values associated with a particular N×N convolution to other sums of 3×3 convolution values associated with the particular N×N convolution to generate the N×N convolution value for respective N×N convolutions.

12. The integrated circuit device of claim 9 wherein the neural network engine is to add respective sums of 3×3 convolution values associated with a particular N×N convolution to other sums of 3×3 convolution values associated with the particular N×N convolution, by circuitry of the neural network engine performing neural network operation in which some of the weights values of a first column have a value of "1" and weights values of other columns have a value "0".

13. The integrated circuit device of claim 9 wherein the neural network engine comprises:

a plurality of parallel multipliers;

a plurality of adders; and a plurality of registers including registers for receiving the image values and registers for receiving weights values of a respective 3×3 weights matrix, wherein respective parallel multipliers are coupled to one of the registers for receiving the image values and one of the registers for receiving one of the weights values, and the output of respective parallel multipliers is coupled to one of the adders.

14. The integrated circuit device of claim 9 comprising a write circuit to store respective sums of 3×3 convolution values on a data storage device or in a local memory of the integrated circuit device.

15. The integrated circuit device of claim 14 wherein the image file is stored on the data storage device or in the local memory of the integrated circuit device.

16. The integrated circuit device of claim 14 wherein the read circuit is to perform a read of the data storage device to obtain the weights matrix for the N by N convolution neural network (CNN).

17. A programmable logic device comprising:
a read circuit, circuitry of the read circuit to read one or more lines of image values from an image file and to perform a read to obtain a weights matrix for a N by N convolution neural network (CNN), where N is greater than 3;
a write circuit;
an N×N CNN circuit comprising:
a neural network engine, circuitry of the neural network engine to perform neural network operations;
a controller coupled to the neural network engine, the read circuit and the write circuit, circuitry of the controller to divide the weights matrix into a plurality of 3×3 weights matrixes and load configuration files for a 3×3 CNN into the integrated circuit device to form a 3×3 CNN core in the neural network engine;
a weight matrix framer circuit coupled to the read circuit and to the neural network engine, circuitry of the weight matrix framer circuit to load the weights values of one of the 3×3 weights matrixes into the neural network engine;
an activation matrix framer circuit coupled to the read circuit and to the neural network engine, the activation matrix framer circuit including a three-line buffer to store three lines of the read image values as a first set of image values, circuitry of the activation matrix framer circuit to load 3 rows and 3 columns of image values from the first set of image values into the neural network engine,
wherein, upon receiving the weights values and the image values, circuitry of the neural network engine is to perform a 3×3 CNN operation of the 3×3 CNN core using the loaded image values and the loaded weights values as input to the 3×3 CNN operation to generate a 3×3 convolution value,
wherein the activation matrix framer circuit is to repeat loading 3 rows and 3 columns of the first set of image values into the neural network engine and the neural network engine is to repeat the informing a 3×3 CNN operation of the CNN core, until all columns in the first set of image values have been processed, and
wherein the weight matrix framer circuit is to repeat the loading the weights values of one of the 3×3 weights matrixes into the neural network engine, the activation matrix framer circuit is to repeat the loading 3 rows and 3 columns of the first set of image values into the neural network engine and the neural network engine is to repeat the performing a 3×3 CNN operation of the CNN core, until all columns in the first set of image values and all 3×3 weights matrixes associate with the first set of image values have been processed; and
an accumulator circuit coupled to the neural network engine and coupled to the write circuit, circuitry of the accumulator circuit to sum together the 3×3 convolution values that are associated with a particular N×N convolution and associated with a particular set of image values and store the sums of 3×3 convolution values,
wherein the read circuit is to repeat the reading one or more lines of image values, the activation matrix framer circuit is to repeat the storing of three lines to store respective additional sets of image values in the three-line buffer, the weight matrix framer circuit is to repeat the loading the weights values of one of the 3×3 weights matrixes, the neural network engine is to repeat the performing a 3×3 CNN operation and the accumulator circuit is to repeat the summing and the storing the sum, until all columns in respective sets of image values have been processed and all lines of image values in the image file have been processed, and
wherein circuitry of the programmable logic device is further to add sums of 3×3 convolution values associated with a particular N×N convolution to other sums of 3×3 convolution values associated with the particular N×N convolution by performing neural network operations of the neural network engine in which some of the weights values are set to a value of 1, and other ones of the weights values are set to a value of 0, to generate an N×N convolution value for respective N×N convolutions.

18. The programmable logic device of claim 17 further comprising:
other configurable logic circuits external to the N×N CNN circuit;
local memory external to the N×N CNN circuit, the local memory coupled to the other configurable logic circuits and the N×N CNN circuit,
an input and output (I/O) circuit coupled to the controller and to the other configurable logic circuits, wherein the I/O circuit is to receive the N×N convolution values for respective N×N convolutions and the write circuit is to store the N×N convolution values for respective N×N convolutions in a data storage device coupled to the programmable logic device or in the local memory.

19. The programmable logic device of claim 18 wherein the image file is stored in the data storage device or in the local memory.

20. The programmable logic device of claim 18 wherein the N×N convolution values are stored in the local memory so that respective N×N convolution values can be access by the other configurable logic circuits of the programmable logic device.

* * * * *